United States Patent [19]

Foster et al.

[11] Patent Number: 5,630,476
[45] Date of Patent: *May 20, 1997

[54] ROCK RAKING APPARATUS

[75] Inventors: Phillip W. Foster; Gerald T. Foster; Paul Burton, all of Lee; John J. Broz, Hinckley, all of Ill.

[73] Assignee: Farmers' Factory Co., Lee, Ill.

[*] Notice: The term of this patent shall not extend beyond the expiration date of Pat. No. 5,564,506.

[21] Appl. No.: 607,340

[22] Filed: Feb. 26, 1996

Related U.S. Application Data

[63] Continuation-in-part of Ser. No. 387,305, Feb. 27, 1995, Pat. No. 5,564,506.

[51] Int. Cl.$^6$ .................................................. A01D 19/02
[52] U.S. Cl. .................................................. 171/63; 172/554
[58] Field of Search .................................................. 171/63; 172/554; 56/328.1, 344, 345, 351, 358, 359; 15/82, 83, 84, 85

[56] References Cited

U.S. PATENT DOCUMENTS

| | | | |
|---|---|---|---|
| 2,804,156 | 8/1957 | Greaves | 171/63 X |
| 3,637,024 | 1/1972 | Baskett | 171/63 |
| 3,746,099 | 7/1973 | Black | 56/328.1 X |
| 3,923,101 | 12/1975 | Donohue | 171/63 |
| 4,113,023 | 9/1978 | Baskett | 171/63 |
| 4,364,434 | 12/1982 | Erholm | 171/63 |
| 4,593,426 | 6/1986 | Chrisley | 171/63 X |
| 4,608,725 | 9/1986 | Jackson | 56/328.1 X |
| 4,723,607 | 2/1988 | Hansen | 172/554 X |
| 5,060,732 | 10/1991 | Baskett | 171/63 |
| 5,329,661 | 7/1994 | Smith | 171/63 X |

FOREIGN PATENT DOCUMENTS

| | | | |
|---|---|---|---|
| 2687533 | 8/1993 | France | 171/63 |
| 456591 | 3/1975 | U.S.S.R. | 171/63 |
| 1752248 | 8/1992 | U.S.S.R. | 171/63 |

Primary Examiner—Dave W. Arola
Assistant Examiner—Christopher J. Novosad
Attorney, Agent, or Firm—Leydig, Voit & Mayer Ltd.

[57] ABSTRACT

A rock raking apparatus which is adapted to be attached to a self-propelled vehicle and includes a rock raking unit with a toothed rotor and a rock collector bucket pivotably connected to the raking unit. The rotor is driven to propel rocks into the bucket. The raking unit includes a power-rotated brush positioned to deflect the propelled rocks into the rear of the bucket, to clean the surface of the rotor to prevent carryover and to prevent the formation of rock barricades at the entrance of the bucket to assure that the bucket is filled. The rotor is based on a cylindrical drum having a pattern of symmetrical radially extending teeth affixed to the peripheral surface thereof, with the pattern also being symmetrical so that the drum is reversible end for end when the leading edges of the teeth are worn. Double pivot mounts allow limited floating of the raking unit with respect to the bucket to accommodate uneven ground.

15 Claims, 6 Drawing Sheets

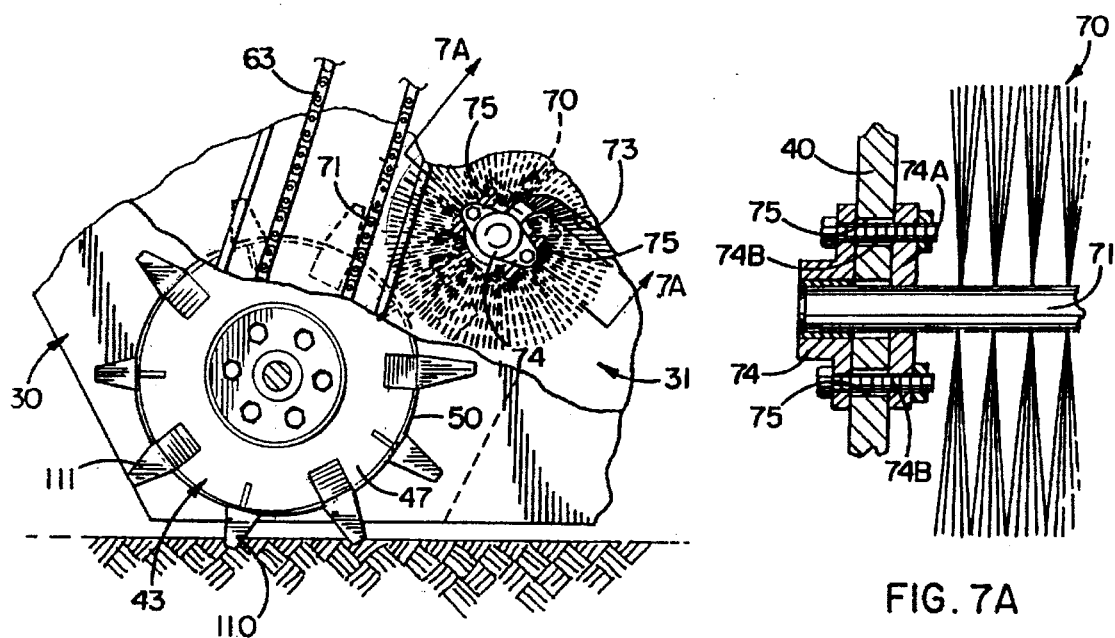
FIG. 7
FIG. 7A
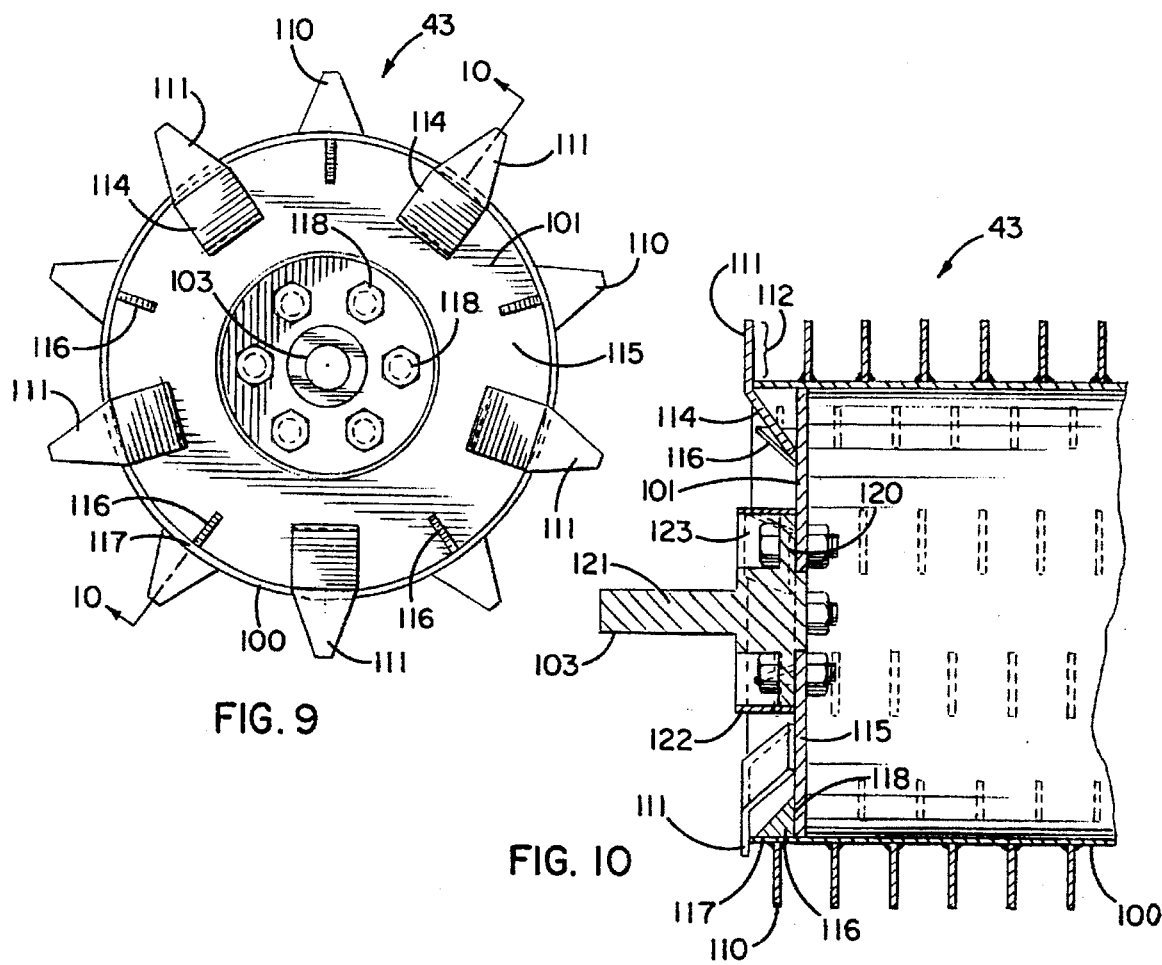
FIG. 9
FIG. 10

ROCK RAKING APPARATUS

CROSS-REFERENCE TO A RELATED APPLICATION

This application is a continuation-in-part application of U.S. application Ser. No. 08/387,305, filed Feb. 27, 1995, entitled Rock Raking Apparatus, now U.S. Pat. No. 5,564,506.

BACKGROUND OF THE INVENTION

This invention relates generally to apparatus for raking up rocks from the ground and, more particularly, to apparatus adapted to be attached to a self-propelled vehicle and adapted to rake up the rocks as the vehicle travels over the ground.

In our prior application, Ser. No. 08/387,305 (hereafter our prior application) we disclosed and claimed apparatus for raking rocks which proved to be a highly effective advance in the art. This application is intended to describe and claim certain improvements therein. In one aspect, the rotor construction which was subsequently incorporated into the rock raking apparatus, has a new and improved structure. This application is also intended to describe at greater length certain important functional relationships between elements of the structure described in detail in our prior application. In other words, our prior application adequately described the structure, and how to make an apparatus capable of meeting the benefits of the invention. The present application better describes functional relationships between those disclosed structural elements.

In our prior application, the rotating brush was disclosed as being adapted to clean the surface of the rotor. That is an important function, but it will be found that the brush when positioned and operated as described in our prior application, performed several additional functions. One of those is the deflection of rocks propelled by the rotor, from the brush into the rear of the bucket. The second is the prevention of formation of a rock barricade at the entrance of the bucket, with the result being the ability of the apparatus to reliably fill the bucket. These functions, it will be found, are accomplished when one follows the structural disclosure of our prior application.

Rock raking apparatus is disclosed in Baskett U.S. Pat. No. 5,060,732. In general, the apparatus comprises a raking unit having a toothed rotor supported to rotate about a laterally extending axis by two laterally spaced side walls. A bucket is pivotally connected to one end of the raking unit and collects the rocks raked up by the unit. The bucket also is pivotally connected to lift arms of the vehicle and, by actuating such arms, the raking unit and the bucket may be lifted from the ground to a transport position. After the raking unit has been moved to a dumping location, an actuator between the vehicle and the bucket is operated to cause the bucket to pivot to an open position relative to the raking unit and enable dumping of the rocks. In order to enable lifting of the raking unit and opening of the bucket, additional actuators are required between the raking unit and the bucket.

The rotor of the raking unit of the Baskett patent is in the form of a hollow drum. Laterally extending and angularly spaced channels are welded to the periphery of the drum and each carries a plurality of laterally spaced specially shaped teeth. The teeth/channel assemblies are relatively complex and non-symmetrical, and can create problems in that small rocks and dirt tend to become trapped between the teeth and against the drum and are carried over the drum rather than being raked up.

Additional rock raking apparatus is disclosed in Baskett U.S. Pat. No. 4,113,023 and Erholm U.S. Pat. No. 4,364,434. Those devices, however, require extremely complex raking units in that the apparatus of the Baskett '023 patent utilizes multiple rotors while the apparatus of the Erholm patent utilizes endless chains to carry the raking teeth.

SUMMARY OF THE INVENTION

The general aim of the present invention is to provide new and improved rock raking apparatus which, when compared to other commercially available apparatus of the same general type, is of simpler and less expensive construction, is easier to operate, and is more rugged and durable.

A further object of the invention is to provide such an apparatus having a rotor adapted to reduce weight of the overall device, and improve longevity thereof by providing a structure which is both simple and symmetrical so that the rotor can be reversed end for end when the teeth are worn, to provide a second cycle of life in the reversed orientation.

With respect to an important functional feature of the invention, an object is to provide a rock raking apparatus which is configured to prevent partial filling of the bucket which would be occasioned when a rock barricade is formed near the entrance of the bucket. In accordance with this aspect of the invention, it is an object to provide an arrangement which is capable of completely filling the bucket under most if not all operating conditions.

A further object of the invention is to provide a raking apparatus in which the bucket may be opened relative to the raking unit simply by reversing the direction of rotation of the rotor and causing the rotor to coact with large rocks to force the bucket open.

Another object is to provide raking apparatus in which the raking unit is connected to the bucket in such a manner as to enable flexibility in maneuvering the bucket relative to the raking unit, to enable each side of the raking unit to float vertically through a limited range relative to the other side of the unit as the rotor passes over uneven ground and to the raking unit to float vertically through a limited range relative to the vehicle.

Still another object is to provide raking apparatus having a power-rotated brush for clearing the rotor of rocks and dirt which tend to carry around with the rotor.

These and other objects and advantages of the invention will become more apparent from the following detailed description when taken in conjunction with the accompanying drawings.

BRIEF DESCRIPTION OF THE DRAWINGS

FIG. 7 is a view of certain components shown in FIG. 5 with still other parts being broken away for purposes of clarity.

FIG. 7A is an enlarged fragmentary cross-section taken substantially along the line 7A—7A of FIG. 7.

FIG. 9 is an end elevation of the rotor of FIG. 8.

FIG. 10 is a partial sectional view of the rotor taken generally along the line 10—10 of FIG. 9.

Figures 1, 2:
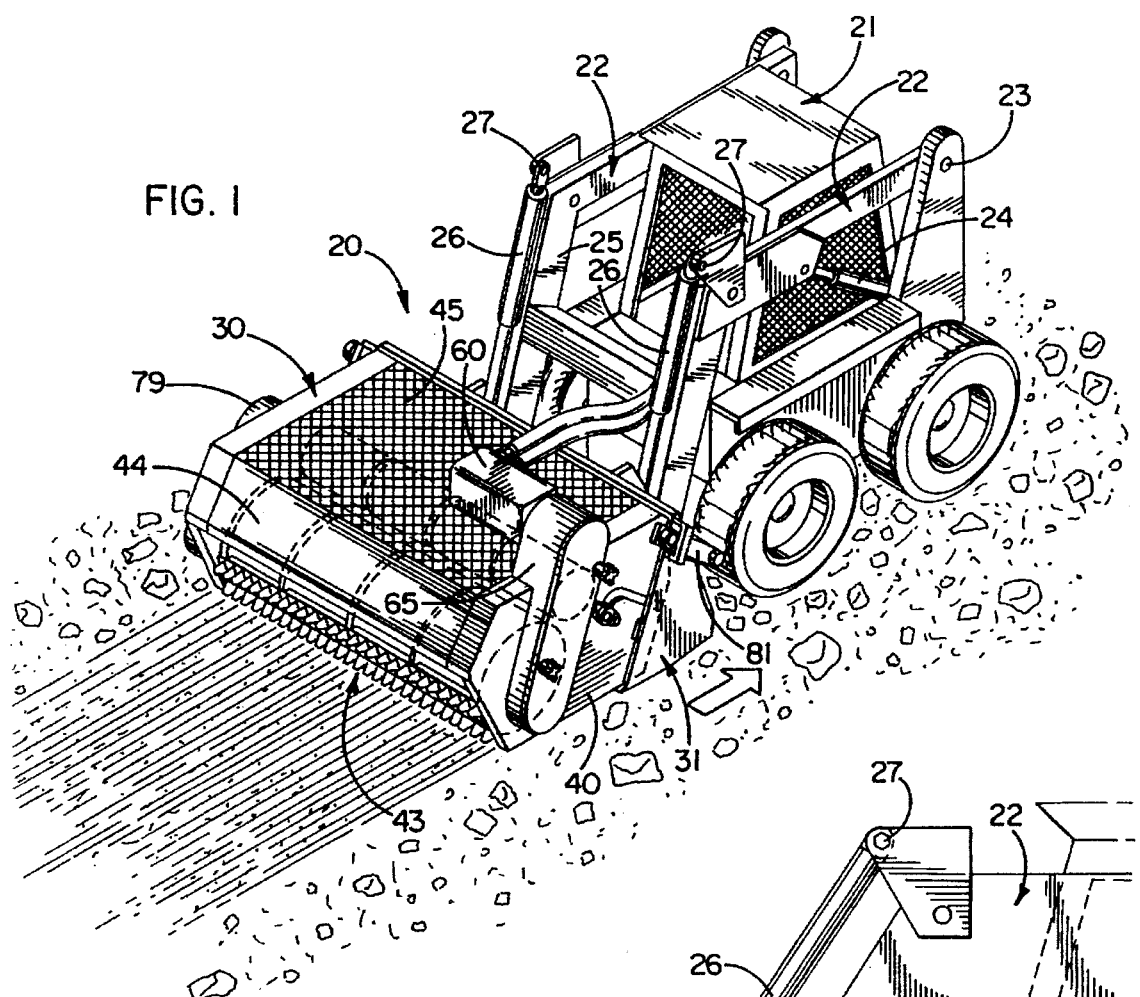
FIG. 1 is a perspective view of new and improved rock raking apparatus incorporating the unique features of the present invention, and shows the apparatus attached to a typical vehicle.
FIG. 2 is a side view of the apparatus and shows the collecting bucket in an open position during travel of the raking unit along the ground.

While the invention is susceptible of various modifications and alternative constructions, certain illustrated embodiments hereof have been shown in the drawings and will be described below in detail. It should be understood, however, that there is no intention to limit the invention to the specific forms disclosed, but on the contrary, the intention is to cover all modifications, alternative constructions and equivalents falling within the spirit and scope of the invention.

DETAILED DESCRIPTION OF THE PREFERRED EMBODIMENTS

As shown in the drawings for purposes of illustration, the invention is shown as incorporated in apparatus 20 for raking up rocks from the ground. The apparatus may, for example, be used by a landscaper to clear rocks from a construction site and to smooth the ground.

The apparatus 20 is attached to a self-propelled vehicle 21 which, in this particular instance, is of the type conventionally known as a skid steer loader. The vehicle, as is conventional, includes a pair of laterally spaced lift arms 22 which are pivotally supported at 23 near the rear of the vehicle to swing upwardly and downwardly under the control of two reciprocating hydraulic actuators 24, only one of the actuators being visible. Portions 25 of the arms extend downwardly in front of the vehicle. Located in front of and extending substantially parallel to the downwardly extending arm portions 25 are two additional reciprocating hydraulic actuators 26 whose purpose will be explained subsequently. The upper end portions of the actuators 26 are pivotally connected to the arms 22 as indicated at 27.

The raking apparatus 20 includes a raking unit 30 and a collecting bucket 31 located adjacent one end of the raking unit. As shown most clearly in FIG. 8, the bucket 31 includes a rear wall 32, two laterally spaced side walls 33, a bottom wall 34 and a laterally extending scraper blade 35 attached to the forward edge of the bottom wall. In this specific instance, laterally spaced mounting brackets 36 are attached to the rear side of the rear wall 32 and are pivotally connected at 37 (FIG. 2) to the lower ends of the downwardly extending arm portions 25 so as to support the bucket for pivoting about a laterally extending axis relative to the arms. Such pivoting is effected by the actuators 26, which are pivotally connected at their lower ends to the upper ends of the brackets 36 as indicated at 38.

Herein, the raking unit 30 comprises a pair of laterally spaced side walls 40 and 41 (FIG. 8) which are connected to the bucket 31 in a manner to be explained subsequently, the connection between the side walls and the bucket permitting the bucket to be moved between a closed position (FIG. 5) and an open position (FIG. 2) relative to the raking unit. A toothed rotor 43 extends laterally between and is supported for rotation by the side walls. During normal operation, the raking unit 30 and the bucket 31 are pulled rearwardly by the vehicle 21, the rotor 43 is rotated in a counterclockwise direction (FIGS. 2 and 5) and, as an incident thereto, the rotor rakes rocks from the ground and propels the rocks into the bucket while the bucket is in a closed position relative to the raking unit. A shield 44 (FIGS. 1 and 8) extends between the upper forward end portions of the side walls to add stiffness to the side walls and also to guard against rocks being thrown forwardly. In addition, a heavy screen or grate 45 such as expanded metal spans the upper ends of the side walls to further connect the side walls and to enable the operator to see the rotor during operation of the raking unit.

Figure 5:
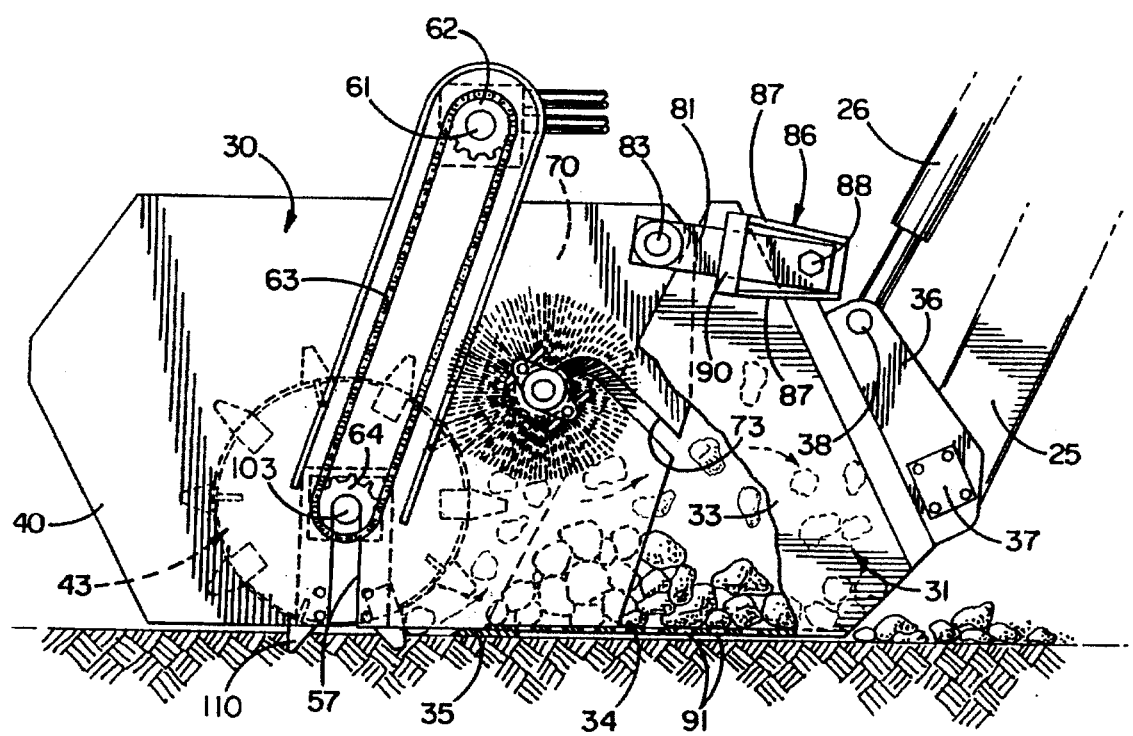
FIG. 5 is an enlarged view similar to FIG. 3 illustrating the functionality of the brush in deflecting rocks into the bucket while cleaning the rotor periphery.
Figure 6:
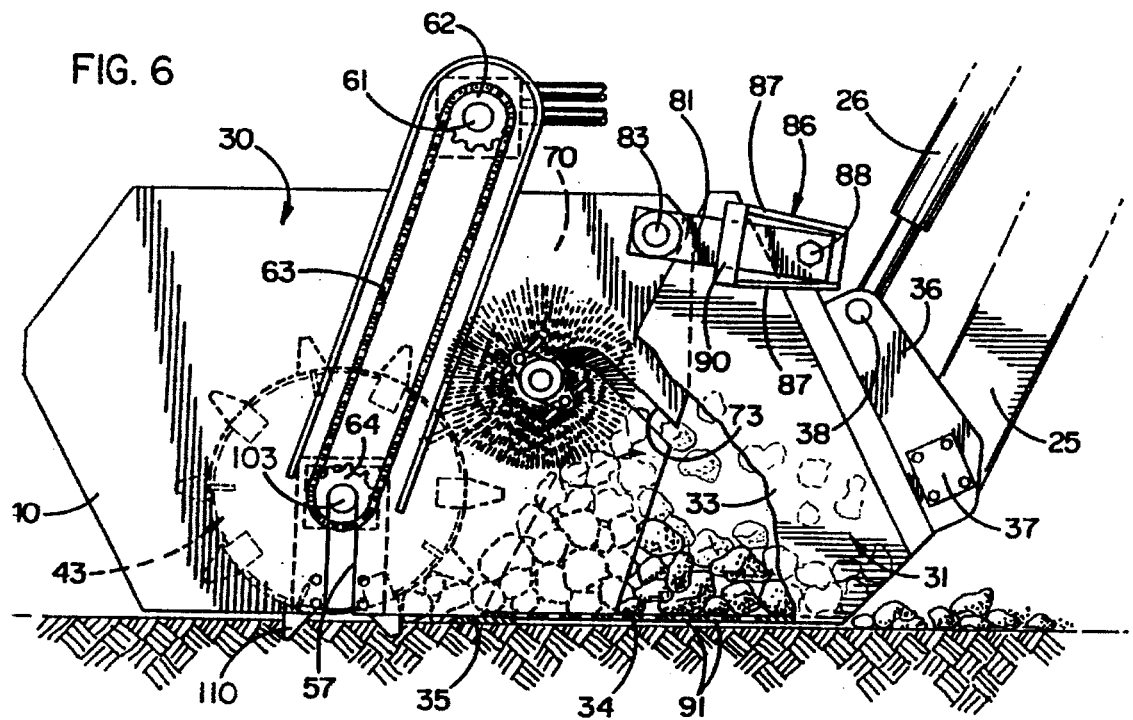
FIG. 6 is a view similar to FIG. 5 but showing the brush acting to prevent formation of a rock barricade at the entrance of the bucket.

In accordance with the invention, the toothed rotor 43 is associated with deflector means particularly adapted to deflect rocks into the bucket in such a way as to assure filling of the bucket. In the illustrated embodiment, the deflector means is shown as a rotating brush assembly 70 positioned in the path of rocks which are propelled by the toothed rotor, and adapted to intercept such rocks and deflect them into the rear of the bucket. It will be seen from FIGS. 5 and 6 that the arrangement provides several functions for the brush in combination with the toothed rotor. The brush is positioned at about one or two o'clock, such that rocks which are propelled by the toothed rotor impact the brush and are deflected into the rear of the bucket as shown in FIG. 5. In addition, the bristles of the brush engage the periphery of the rotor, so as to remove any rocks or dirt which might remain on the rotor surface, to prevent carryover of such rocks or dirt. Finally, as will be appreciated from FIG. 6, in the event a pile of rocks begins to form at the entrance of the bucket to create a potential rock barricade, the brush can engage the top of that pile and the bristles have sufficient stiffness to dislodge rocks toward the back of the bucket. It has been found using the rotor and brush arrangement as described herein, that the bucket is reliably filled, and that an operator seated in the vehicle will be able to see rocks rising to the top of the bucket upon filling, and use that as an indicator to temporarily suspend rock raking and dump the collected load.

The rotor of the present embodiment is also considered an improvement over that described in our prior application, in that it is simpler in construction and lighter in weight. In the present implementation, the rotor comprises a rigid cylindrical tube or drum having a plurality of symmetrically formed relatively thin, elongate teeth welded directly to the surface of the rotor. As will become more apparent, the rotor is of sturdy and reliable construction, and as compared to the rotor shown in our prior application, is on the order of 30% lighter, for a rotor of equivalent length.

Figure 8:
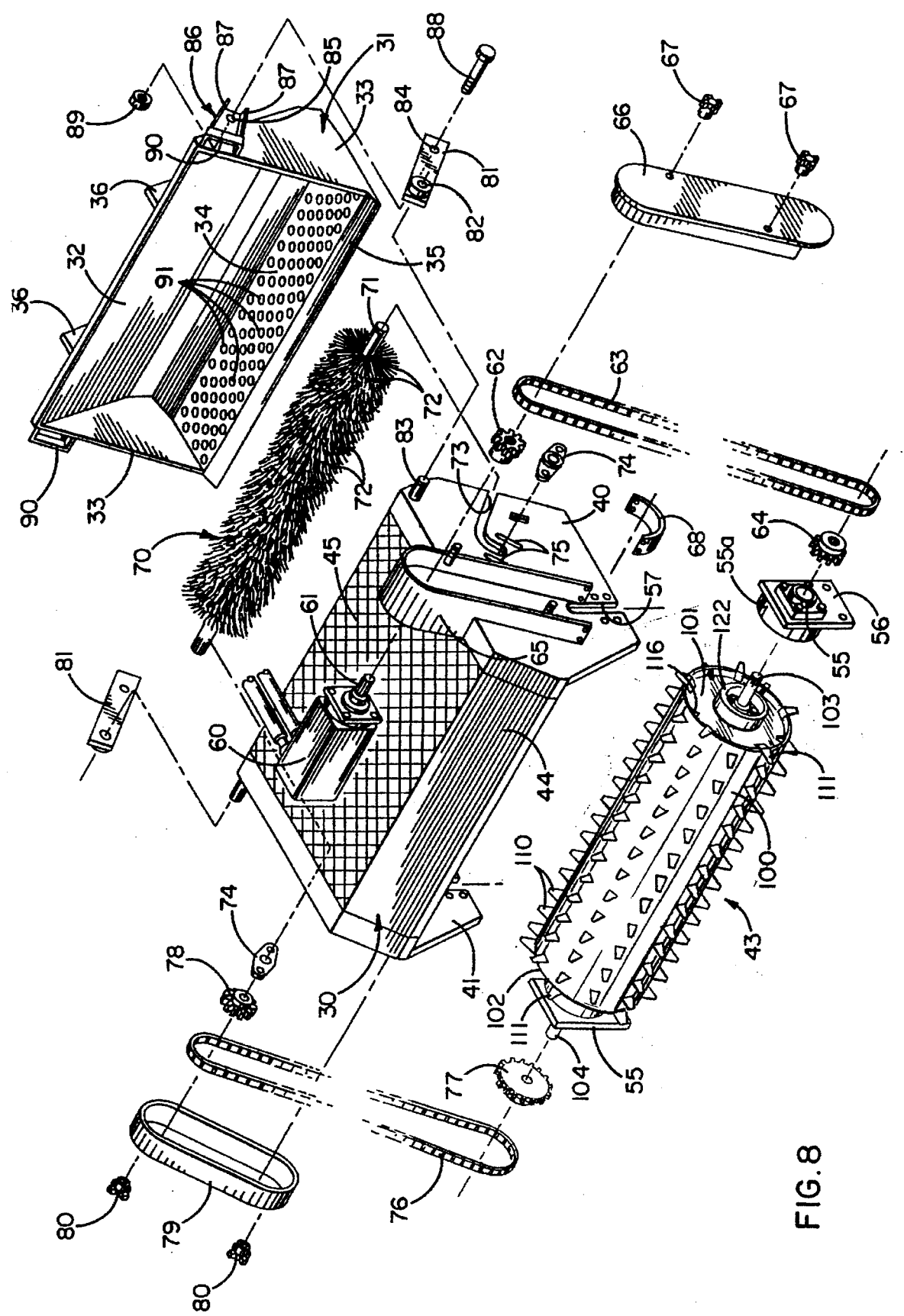
FIG. 8 is an exploded perspective view of the raking apparatus.

Referring in greater detail to FIGS. 9 and 10, it will be seen that the rotor 43 is constructed of a cylindrical length of metal pipe 100 having end plates affixed in the ends thereof. FIG. 10, which shows only one end of the rotor 43, illustrates plate 101 being secured in position; FIG. 8 points out that end plate 102 will be at the opposite end of the rotor, and it is fixed in place exactly in the same fashion. The end plates carry journals 103, 104 for mounting the rotor for rotation in bearings 55 carried in mounting plates 56 secured to the side walls 40, 41. Typically the cylindrical pipe 100 is on the order of 16 inches in diameter, and has a wall thickness of about 3/16 inch. Elongate metal teeth 110 are welded directly to the surface of the pipe 100 in alternating rows as suggested in FIGS. 8 and 9. It will be noted that FIG. 8 has simplified the showing of the rotor by eliminating approximately half the teeth in each row, so that the spacing between teeth in a row in the FIG. 8 showing is exaggerated in order to simplify the drawings.

The teeth themselves are sufficiently long, typically on the order of 2 3/16 inches, to reliably dig into the soil and remove and propel rocks into the bucket, but are not so long as to present a substantial danger of breakage. We prefer to use AR-400 steel for the material of the teeth, preferably about 3/16 inch in thickness. We have found a rotor with teeth of this type to possess good reliability.

Except at the rotor ends, which construction will soon be described, the teeth are affixed to the cylindrical drum by welding, preferably using a robot having a fixture which holds the tooth butted against the wall of the shell during the welding operation. Preferably the lower surface of the tooth is slightly radiused to fit closely on the drum prior to the welding operation.

Referring particularly to FIGS. 8 and 10, it will be seen that the illustrated rotor includes ten rows of teeth, with teeth in the even numbered rows being aligned, and offset to be between similarly aligned teeth in the odd numbered rows. In such a construction, each end plate 101, 102 will carry teeth for five of the rows. For example FIG. 9 illustrates the end plate 101 which has five teeth 111 welded thereto. Comparing FIGS. 9 and 10, it will be seen that the teeth 111 have a radially disposed tooth portion 112 which projects outwardly from the periphery of the drum 100, and a leg 114 which is bent inwardly to contact a circular plate 115 which makes up the main structural member of the end cap assembly 101. The teeth 110 which are in the alternate rows are fixed directly on the drum, as are all of the remaining peripheral teeth. In the positions which are not occupied by end teeth 111, a plurality of gussets 116 are welded in place. Referring to the lower portion of FIG. 10, it will be seen that the gussets 116 are triangular in shape and have one wall 117 secured to the inner periphery of the drum 100 and a second wall 118 secured to the circular plate 115. A plurality of threaded fasteners 118 are affixed in a circular pattern centered on the plate 115. The threaded fasteners 118 are positioned to receive bolts which secure the stub shaft assembly 103 to the end plate 101.

It is preferred to assemble the rotor by first welding the threaded fasteners 118 in position. Then, either before or after attaching the stub shafts 103, 104 welding the end plates in position in the respective ends of the drum. Thereafter, the stub shafts can be used to journal the rotor, and an automated welding robot utilized to weld all of the teeth 111, 110 into their appropriate positions. The gussets 116 can also be positioned and welded at that time.

Referring to FIGS. 8 and 9 it will be appreciated that the teeth project radially from the surface of the cylindrical rotor, and are absolutely symmetrical with respect to that cylindrical surface. Although the teeth are configured to avoid breakage in operation, they will tend to wear with use. Worn teeth will not propel rocks into the bucket (and into the deflector roller) in the most desirable path, and after a set of teeth is substantially worn, a repair should be undertaken. With the rotor configured as described above, having simple symmetrical teeth fixed directly to the surface of the rotor, the rotor is adapted to be reversed end-for-end, which creates a new set of leading edges for all of the teeth, in effect presenting a new and effectively "refurbished" rotor for continued use of the rock raker. Thus, when the rock raker is operated so long as to wear a set of teeth to render operation inadequately reliable, it is simply necessary to remove the rotor, reverse it end-for-end, then replace it in the unit, for continued operation, without the necessity for replacing teeth or the rotor at that stage of the life of the equipment.

It will be noted that the stub shafts 103, 104 which mount the rotor, fit into adaptor plates 56 which carry bearings 55 which in turn are bolted to the inboard sides of the end plates 40, 41. To facilitate assembly of the rotor 43 with the side plates 40 and 41, such plates are formed with vertically elongated slots 57 which open downwardly out of the lower edges of the plates. Thus, the rotor may be installed by lifting the rotor upwardly to locate the stub shafts in the slots and by then bolting the plates 56 to the plates 40 and 41.

As will be best seen in FIGS. 9 and 10, the stub shaft assemblies 103 (and 104 not shown in those figures) are formed on a base member 120 from which rises a journal 121 sized to fit into the bearings 55 carried by the adaptor plates 56 (see FIG. 8). A cylindrical flange 122 is affixed to and surrounds the base 120 and provides a protective recess 123 which receives the bolts 118 which secure the stub shaft assembly 103 to the end plate 115. The cylindrical flange 122 fits within flange 55a to prevent wire, rope or other elongated fibrous objects which might be encountered by the rock raker from wrapping up in the bearing area and causing damage.

Driving of the rotor 43 is effected by a reversible motor 60 (FIGS. 1 and 8) which herein is a hydraulic motor powered by the hydraulic system of the vehicle. The motor is supported on the grate 45 and includes an output shaft 61 (FIG. 8) to which is secured a sprocket 62. A chain 63 is trained around the sprocket and also around a sprocket 64 secured to the stub shaft 103. The stub shaft 103 is a precision splined shaft to establish a rugged torque coupling with the drive sprocket 64. The chain is shielded by a guard 65 on the side plate 40 and by a cover 66 adapted to be releasably secured to the guard by fasteners 67. A lower end section 68 of the guard is releasably attached to the main body of the guard to enable the sprocket 64 to move upwardly into the main body of the guard when the stub shaft 103 is lifted upwardly into the slot 57.

The rotor structure described above is found to be highly beneficial not only in dislodging rocks and propelling them into the bucket for collection, but also in tillage of the soil. The rotor is a rather heavy assembly, and the blades are thin and long, projecting over two inches into the soil so that they effectively cut up and till the soil to a depth of about two inches. Thus, not only are rocks and debris picked up from the area, but the tillage aspect of the invention provides a relatively neat appearing finished area.

It was generally described above that the rotating brush 70 in its preferred configuration provides three functions for the rock raking apparatus. Importantly, it serves as a deflector to intercept rocks propelled upwardly into the bucket, and deflect them to the rear of the bucket. Secondly, the bristles engage the surface of the rotor, so that debris, rocks and packed dirt which might otherwise tend to carry over the top of the rotor to be redeposited on the raked ground, are swept from the rotor and returned to the bucket. Finally, the brush is positioned so that it will engage any false rock barricades being created at the entrance to the bucket, to remove the top from such barricades and push rocks past the forming barricade into the back of the bucket, to assure filling of the bucket.

Different types of brushes may be used. For simplicity, the brush 70 is illustrated as including a central shaft 71 (FIG. 7A) which carries a series of disc-like brush segments 72 each having stiff bristles. The segments are located closely adjacent one another and are positioned axially such that one segment is located between axially adjacent teeth 110, 111. In an alternative, not illustrated in the drawings, the bristles are packed into a steel form which in turn is wound to form a central core to which end plates are welded, the end plates carrying the stub shafts illustrated in FIG. 7A. In either event, the brush is positioned above and to the rear of the rotor 43 and, when viewed from the outboard side of the side plate 40, is located at roughly a one o'clock position relative to the rotor.

The brush 70 is mounted so as to be capable of being easily installed and removed and of being easily adjusted toward the rotor 43 to compensate for wear. To this end, the side plates 40 and 41 are formed with generally L-shaped slots 73 (FIG. 8). The long leg of each slot is inclined downwardly and rearwardly and opens out of the rear edge of the respective side plate while the short leg of each slot is angled downwardly and forwardly. As a result, the end portions of the shaft 71 may be moved radially into the slots from the rear edges of the side plates. The shaft end portions are journaled by bearings 74 carried by plates 74A (FIG. 7A) which are secured to the inboard sides of the side plates by bolts 79B fitting through elongated slots 75 located on opposite sides of and extending generally parallel to the short legs of the slots 73. By loosening the bolts, the shaft may be shifted downwardly in the short legs of the L-shaped slots 75 in order to move the brush 70 closer to the rotor 43 when the bristles of the brush wear.

Advantageously, the brush 70 is rotated in the same direction as the rotor 43 so as to perform the functions described above. Rotation of the brush is achieved in a simple manner by means of a chain 76 (FIG. 8) located adjacent the outboard side of the side plate 41 and trained around sprockets 77 and 78 on the stub shaft 104 and the shaft 71, respectively. Thus, rotation of the rotor 43 is transmitted to the brush 70 by the chain 76 so as to rotate the brush in the same direction as the rotor. The brush can be rotated at various relative speeds with respect to the rotor. However, we have found it important to utilize a gear ratio which rotates the brush at approximately twice the speed of the rotor. Such a speed ratio is found to provide adequate cleaning of the rotor surface, a correct deflection of rocks propelled into the bristles, and a sufficient amount of brush action on forming barricades to assure filling of the bucket. The chain is shielded by a guard 79 which is releasably secured to the side plate 41 by fasteners 80. The plates 56 and 74A close the slots 57 and 73, respectively, to prevent dirt and dust from flying outboard through the slots and fouling the chains 63 and 76.

The stub shaft 104 is a simple keyed shaft for coupling to the sprocket 77. When the leading edges of the teeth 110, 111 wear, the stub shafts 103 and 104 may be removed, the rotor may be turned end-for-end and then the stub shafts may be re-installed. This enables the rotor to be used until the opposite edges of the teeth become worn.

Further in accordance with the invention, the raking unit 30 is connected to the bucket 31 in such a manner as to enable either side of the raking unit to float vertically relative to the other side through a limited range or to float vertically relative to the vehicle 21 in the event the rotor 43 encounters laterally uneven terrain, in the event one of the side plates 40 or 41 rides over a relatively large rock, or in the event either the raking unit or the vehicle falls into a valley or encounters a ridge. For this purpose, the raking unit 30 is connected to the buckets 31 by pivot members 81 (FIG. 8) which are pivotally connected both to the raking unit and to the bucket. The pivot members are substantially identical and thus only the pivot member adjacent the side wall 40 will be described in detail. That pivot member herein is in the form of a flat elongated bar whose forward end portion carries a bushing 82 that is pivotally received on a pin 83 projecting laterally outwardly from the side plate 40 near the extreme upper rear corner thereof. The rear end portion of the bar 81 is formed with a hole 84 which is aligned with a hole 85 formed in the web of a channel 86 having upper and lower flanges 87 and welded to the extreme upper end of the outboard side of side wall 33 of the bucket 31. A bolt 88 extends through the holes 84 and 85 and pivotally attaches the rear end portion of the bar 81 to the channel 86, the bolt being secured by a nut 89. The channel is inclined in an upward and forward direction, and the vertical spacing between the flanges 87 gradually increases as the channel proceeds forwardly. A strap 90 is welded to the front of the channel 86 to reinforce the channel against deflection.

By virtue of the bars 81 being attached to the raking unit 30 and the bucket 31 by the double pivots 83 and 88, respectively, either side of the raking unit is free to float vertically relative to the other side to accommodate laterally uneven terrain. Also, the raking unit may float vertically relative to the vehicle. The bars engage the flanges 87.of the channels 86 to limit the extent of such floating and to prevent excessive relative pivoting of the raking unit and the bucket. In addition, the pivoted bars enable the bucket 31 to be pivoted to an open position relative to the raking unit 30 when the arms 22 are swung upwardly and the actuators 26 are extended (see FIG. 2).

In operation of the apparatus 20, the bucket 31 is normally closed relative to the raking unit 30 as shown in FIGS. 1 and 5 and, when the bucket is closed, the forward end portions of its side walls 30 overlap the outboard sides of the rear end portions of the side walls 40 and 41 of the raking unit while the blade 35 of the bucket is located just rearwardly of the rotor 43. As the vehicle 21 moves rearwardly and as the rotor is rotated counterclockwise, rocks are raked up by the teeth 110, 111 and are swept into the bucket. Advantageously, the bottom wall 34 of the bucket is perforated with several holes 91 (FIG. 8) to allow dirt and small pebbles to fall from the bucket and thereby increase the capacity of the bucket for large rocks.

In some cases, the rocks behind the bucket 31 may be too large for the bucket to clear as the vehicle 21 moves rearwardly. In such an instance, the bucket may be opened relative to the raking unit 30 as shown in FIG. 2 by raising the arms 22 with the actuators 24 and by simultaneously swinging the bucket about the pivots 37 with the actuators 26, such pivoting being permitted by the double-articulated bars 81. After the bucket has moved rearwardly past the large rocks, it may be swung reversely to its closed position and, as an incident thereto, the blade 35 scrapes the large rocks into the bucket or acts in conjunction with the rotor 43 to load the rocks into the bucket. Alternatively, the bucket may be left open and the rotor used to rake the rocks into a windrow as the vehicle travels rearwardly.

Figure 3:
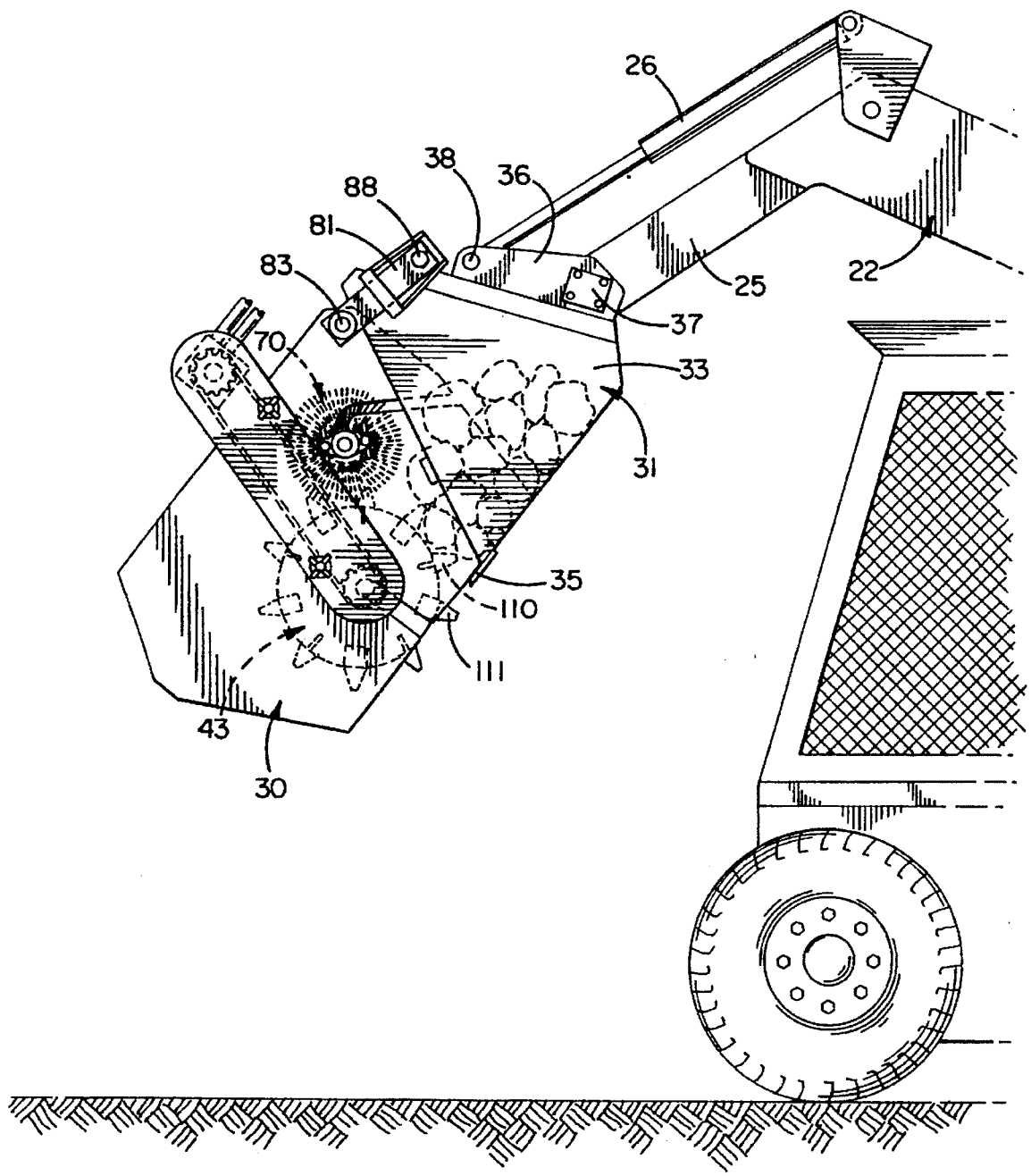
FIG. 3 is a side view showing the apparatus lifted to a position preparatory to dumping the rocks from the bucket.
Figure 4:
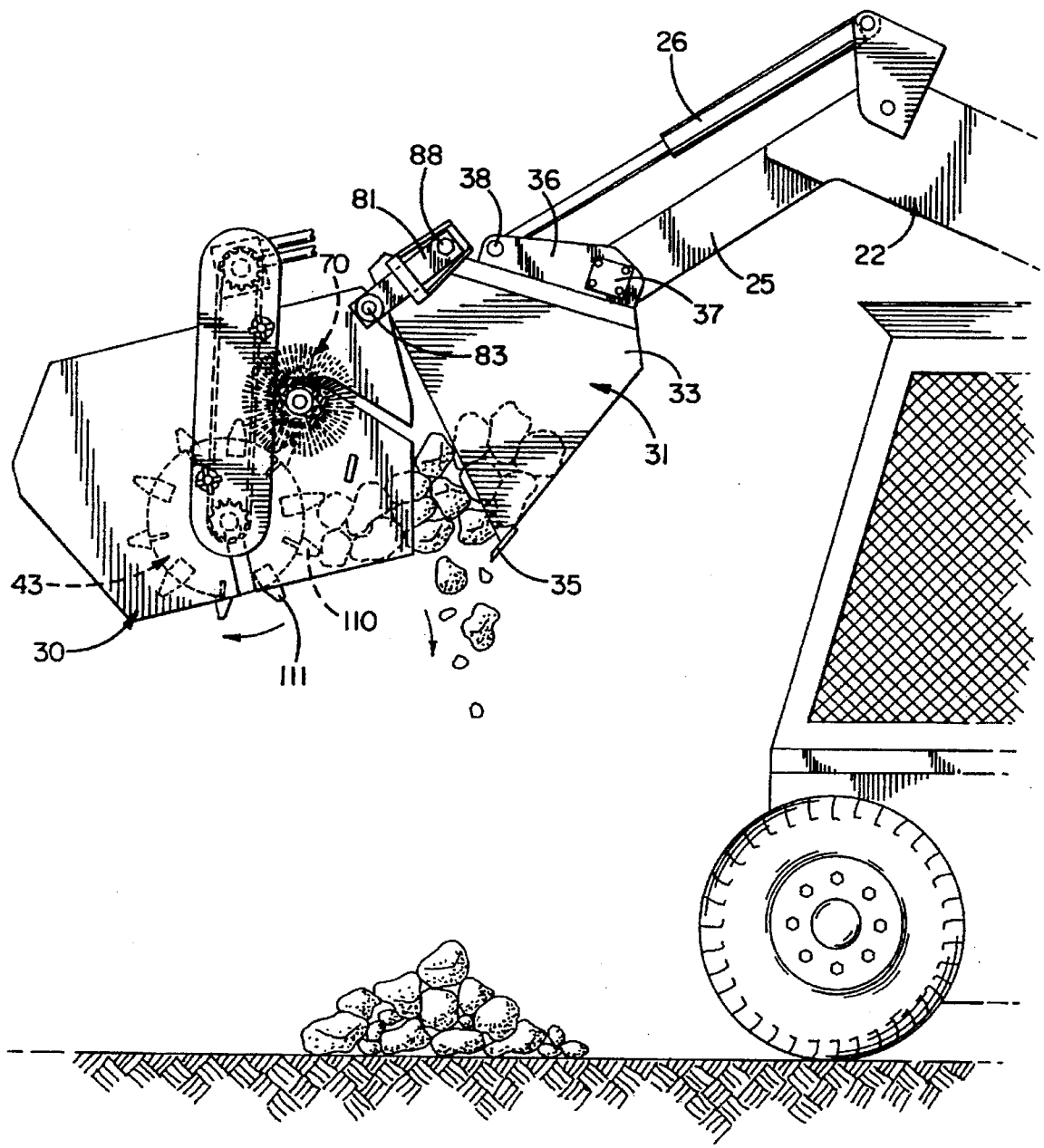
FIG. 4 is a view similar to FIG. 3 but shows the bucket in an open position relative to the raking unit and dumping rocks from the bucket.

After the bucket 31 has been loaded, the bucket and the raking unit 30 may be lifted as a unit to a transport position (not shown) by swinging the arms 22 slightly upwardly with the actuators 24 and by simultaneously retracting the actuators 26. The rotor 43 is stopped as the components are lifted and transported to a site where the rocks are to be dumped. At that site, the arms 22 are further raised and the actuators 26 are extended to move the raking unit to a dump position (FIG. 3). Thereafter, the rotor is rotated reversely (i.e., clockwise as viewed in FIG. 4). Such rotation causes the rocks to wedge between the teeth 110, 111 and the bucket 31 and, as a result, the raking unit 30 is forced clockwise about the pivot 83 as shown in FIG. 4 to open the raking unit relative to the bucket and to allow the rocks to fall to the ground. It will be found that with the bucket lifted into the FIG. 4 position, and with the rotor being rotated in the reverse direction, the rotor creates action among the rocks which tend to move the rocks to the junction between the bucket 31 and raking unit 30, forcing rocks to open the unit and drop the rocks to the ground. The raking unit will swing about its pivot as the rock action causes the unit to swing open and closed, until substantially all of the rocks are dropped from the unit. That action results in ready and efficient emptying of the unit, and without the complication or potential safety hazards occasioned by complex linkages which might need to be operated to swing the raking unit away from the bucket. In short, the pivot bars 81 with the double pivots 83 and 88 at the raking unit 30 and the bucket 31, respectively, enable clockwise swinging and opening of the raking unit relative to the bucket when the rotor is reversed. Thus, there is no need for hydraulic or mechanical dumping actuators between the raking unit and the bucket.

What is claimed is:

1. Apparatus adapted to be attached to a self-propelled vehicle and operable to rake up rocks from the ground as the vehicle moves along the ground, said apparatus comprising a raking unit having first and second ends and having a pair of laterally spaced side walls, a rotor supported by said side walls to rotate about a first laterally extending axis, said rotor having an outer periphery from which extend a plurality of angularly spaced rows of laterally spaced and generally radially extending teeth, a motor for rotating said rotor about said axis, said rotor normally being rotated in a first direction to rake rocks along the ground toward the vehicle and toward the first end of said raking unit when said vehicle is moved in a direction such that said first end of said raking unit is disposed in leading relation to said second end, a bucket movable with said raking unit and normally closing the first end thereof whereby rocks raked along the ground by said rotor are propelled into said bucket, and deflector means for directing rocks propelled by the rotor into the bucket, the deflector means comprising a brush supported by the side walls for rotation about a second axis parallel to the first axis and positioned with respect to the rotor to:

(a) deflect rocks propelled by the rotor into the bucket, (b) remove rocks from the surface of the rotor to prevent carryover, and (c) direct rocks into the rear of the bucket for filling the same.

2. Apparatus as defined in claim 1 in which the brush is driven by and rotates in the same direction as the rotor.

3. Apparatus as defined in claim 2 in which the brush has bristles which penetrate past the rotor teeth so that the bristles sweep the surface of the rotor to prevent carryover of debris.

4. Apparatus as defined in claim 3 wherein the bristles of the brush are sufficiently stiff to deflect rocks propelled by the rotor at the brush into the rear of the bucket.

5. Apparatus as defined in claim 3 wherein the bristles of the brush are sufficiently stiff to prevent rocks from forming a barricade at the entrance of the bucket and to direct said rocks into the rear of the bucket for filling the same.

6. Apparatus as defined in claim 2 wherein the rotor is a cylindrical drum having the laterally spaced and generally radially extending teeth affixed to the outer periphery thereof, and end plates carrying journals secured to the ends of the drum for rotational support by said side walls.

7. Apparatus as defined in claim 2 wherein the vehicle is adapted with means for lifting the raking unit and bucket off the ground to a raised position, the apparatus further comprising means connecting the bucket pivotally to the raking unit, the connecting means including a pivot allowing free pivotable movement of the raking unit with respect to the bucket, the pivot being positioned so that when the bucket is moved to a raised and dumped position:

(1) the raking unit is suspended in a normally closed condition with respect to the bucket; and (2) upon rotation of the motor in a second direction, opening forces are created by the rotor engaging the rocks to pivot the raking unit open relative to the bucket to dump the rocks.

8. Apparatus as defined in claim 2 including a pair of pivot linkages connecting the bucket to the raking unit at the laterally spaced side walls thereof, said pivot linkages being located at the upper end portions of the side walls at the first end of the raking unit.

9. Apparatus as defined in claim 8 in which each pivot linkage includes a bar having one end connected at a first pivot point to the respective side wall and having an opposite end connected at a second pivot point to the bucket whereby the side walls may float vertically relative to one another as the raking unit moves along the ground.

10. Apparatus as defined in claim 9 further including means on the bucket for restricting upward and downward pivoting of the bars to a predetermined range thereby to limit relative vertical floating of the side walls.

11. Apparatus as defined in claim 2 in which the bucket includes a bottom wall, the bottom wall being perforated to allow dirt and pebbles to drop out of the bucket through the bottom wall.

12. Apparatus as defined in claim 2 in which the brush includes mounting shaft means and means for attaching the mounting shaft means to the side walls and for permitting selective adjustment of the brush toward the rotor to compensate for wear of the brush bristles.

13. Apparatus adapted to be attached to a self-propelled vehicle and operable to rake up rocks from the ground as the vehicle moves along the ground, said apparatus comprising a raking unit having first and second ends and having a pair of laterally spaced side walls, a rotor supported by said side walls to rotate about a first laterally extending axis, said rotor comprising a rigid cylinder having an outer periphery with a plurality of angularly spaced rows of laterally spaced and generally radially extending teeth affixed thereto, end caps secured to the ends of the cylinder and having central journals affixed thereto for rotational support of the rotor on the side walls, a motor for rotating said rotor about said axis, said rotor normally being rotated in a first direction to rake rocks along the ground toward the vehicle and toward the first end of said raking unit when said vehicle is moved in a direction such that said first end of said raking unit is disposed in leading relation to said second end, a bucket movable with said raking unit and normally closing the first end thereof whereby rocks raked along the ground by said rotor are propelled into said bucket, and a brush supported by the side walls for rotation, said brush being positioned in the path of rocks propelled by the rotor, and rotated at a speed adequate to deflect said propelled rocks into the bucket, the brush having bristles engaging the periphery of the rotor for clearing debris therefrom to prevent carryover, and the bristles of the brush being sufficiently stiff to prevent formation of a rock barricade at the entrance of the bucket, thereby to allow the bucket to fill.

14. Apparatus adapted to be attached to a self-propelled vehicle and operable to rake up rocks from the ground as the vehicle moves along the ground, said apparatus comprising a raking unit having first and second ends and having a pair of laterally spaced side walls, a rotor supported by said side walls to rotate about a first laterally extending axis, a motor for rotating said rotor about said axis, said rotor normally being rotated in a first direction to rake rocks along the ground toward the vehicle and toward the first end of said raking unit when said vehicle is moved in a direction such that said first end of said raking unit is disposed in leading relation to said second end, a bucket movable with said unit and normally closing the first end thereof whereby rocks raked along the ground by said rotor are propelled into said bucket, a rotating brush positioned and rotated at a speed adequate to deflect rocks propelled by the rotor into the bucket, said rotor comprising a cylindrical drum having a plurality of generally radially extending teeth spaced along and attached to the rotor periphery in a symmetrical pattern, each tooth also being symmetrical, so that the rotor is reversible end for end, end plates closing the respective ends of the drum and having journals secured thereto for mounting the rotor for rotation about said first axis.

15. Apparatus as defined in claim 14 further including means for removably securing the journals to the respective end plates, so that the journals can be interchanged when the rotor is turned end for end.

* * * * *